United States Patent
Marino

(10) Patent No.: US 10,088,383 B2
(45) Date of Patent: *Oct. 2, 2018

(54) SYSTEM AND METHOD FOR DETECTING LEAKS IN A FLUID FILLED VESSEL

(71) Applicant: Red Rhino Leak Detection, Inc., Palm Beach Gardens, FL (US)

(72) Inventor: Mark D. Marino, Palm Beach Gardens, FL (US)

(73) Assignee: Red Rhino Leak Detection, Inc., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,590

(22) Filed: Sep. 29, 2016

(65) Prior Publication Data

US 2017/0030796 A1    Feb. 2, 2017

Related U.S. Application Data

(63) Continuation-in-part of application No. 14/831,771, filed on Aug. 20, 2015, now Pat. No. 9,464,959, which is a continuation of application No. 13/838,618, filed on Mar. 15, 2013, now Pat. No. 9,128,002.

(51) Int. Cl.
| | |
|---|---|
| *G01M 3/20* | (2006.01) |
| *G01M 3/32* | (2006.01) |
| *G01M 3/26* | (2006.01) |
| *G01M 3/04* | (2006.01) |
| *G01M 3/22* | (2006.01) |
| *G01M 3/02* | (2006.01) |
| *G01M 3/10* | (2006.01) |

(52) U.S. Cl.
CPC ............. *G01M 3/226* (2013.01); *G01M 3/02* (2013.01); *G01M 3/32* (2013.01); *G01M 3/3254* (2013.01); *G01M 3/04* (2013.01); *G01M 3/10* (2013.01); *G01M 3/20* (2013.01); *G01M 3/26* (2013.01)

(58) Field of Classification Search
CPC .......... G01M 3/04; G01M 3/10; G01M 3/226; G01M 3/26; G01M 3/3254; G01M 3/20
USPC .......................................................... 73/40
See application file for complete search history.

(56) References Cited

U.S. PATENT DOCUMENTS

| | | | |
|---|---|---|---|
| 3,840,208 A | 10/1974 | Schudel et al. | |
| 5,261,269 A * | 11/1993 | Barker ................. | G01M 3/226 222/174 |
| 5,621,269 A | 4/1997 | Jang | |
| 5,734,096 A * | 3/1998 | McGuigan ............. | G01M 3/02 73/49.2 |
| 6,367,403 B1 * | 4/2002 | Carter .................... | A01K 97/06 114/343 |

(Continued)

*Primary Examiner* — Randy Gibson
*Assistant Examiner* — Gedeon M Kidanu
(74) *Attorney, Agent, or Firm* — Kelly G. Swartz; Widerman Malek, PL

(57) ABSTRACT

A leak detecting device for water filled vessel such as a swimming pool. An annular resilient seal having a central opening contacts the surface of the vessel under water and creates a seal between the resilient seal and the vessel. A rigid housing open in its interior is coupled to the resilient seal and has an opening for an inlet to deliver fluid into the interior of the housing, or couple a flow meter thereto to measure the fluid flow, or deliver a dye into the housing and through the central opening of the resilient seal.

13 Claims, 11 Drawing Sheets

(56) References Cited

U.S. PATENT DOCUMENTS 6,463,791 B1 * 10/2002 Berube ............... G01M 3/2884
73/46
6,823,719 B2    11/2004 Poblete
9,464,959 B2    10/2016 Marino

* cited by examiner

SYSTEM AND METHOD FOR DETECTING LEAKS IN A FLUID FILLED VESSEL

RELATED APPLICATION

In accordance with 37 C.F.R. § 1.76, a claim of priority is included in an Application Data Sheet filed concurrently herewith. Accordingly, the present invention claims priority as a continuation-in-part of U.S. patent application Ser. No. 14/831,771, entitled SYSTEM AND METHOD FOR DETECTING LEAKS IN A FLUID FILLED VESSEL, filed Aug. 20, 2015, which is a continuation of U.S. patent application Ser. No. 13/838,618, filed Mar. 15, 2013, and issued as U.S. Pat. No. 9,128,002 on Sep. 8, 2015, the contents of which are incorporated by reference herein in its entirety.

BACKGROUND

This invention relates to a system and method for leak detection, and, more particularly, to a system and method for detecting leaks in a liquid filled vessel such as a swimming pool.

RELATED ART

The use of leak detecting devices are well known in the art, particularly for use in swimming pools. Pools, whether above ground or underground, do leak. Leaks may occur around pool drains, pool lights, skimmers, suction and discharge lines and other pool surfaces, etc.

There is a need for a simple leak detection system for a swimming pool that is easy to use for a pool attendant or pool owner.

SUMMARY OF INVENTION

Disclose is a leak detecting device for a swimming pool light in a water filled swimming pool comprising a housing having a continuous perimeter edge sized to extend around a swimming pool light forming a hollow interior. The housing has a threaded rod extending through said the housing and terminating in an attachment for anchoring the housing to an underwater swimming pool light. An annular resilient seal is secured to the continuous perimeter edge and is adapted to contact and form a seal between the housing and an underwater surface adjacent to or part of the swimming pool light. The seal is for anchoring in a sealing engagement around the swimming pool light and being in a non-movable stationary position relative to the swimming pool light. An inlet forming an opening through the housing and extending into the opening providing accessible from an exterior to selectively deliver a dye solution for leak detection purposes into the interior of the housing whereby the flow of the dye inserted in the interior is observable by a user of the device for determining leakage underwater within the defined perimeter relative to the defined underwater surface of the swimming pool.

It is an object of this invention to provide a leak detecting system and method for detection leaks in water filled vessel, such as a swimming pool.

It is a further object of this invention to provide such a system that can detect leaks at drains, lights, skimmers, suction and discharge lines, etc.

Another objective of this invention is to provide a transparent housing for visual observation of dye movement.

Still another objective of this invention is to disclose the use of an opaque housing using either transparent panels, sight glass, of a transparent inlet to provide a means for visual observation of dye movement.

Yet another objective of this invention is to disclose various housing anchoring techniques including a threaded rod that attaches with a suction cup, a threaded rod that is secured directly a swimming pool light, a claim that wraps around part of the light and hooks into a drain.

These and other objects are preferably accomplished by providing a resilient seal adapted to contact the surface of the vessel underwater where a leak is suspected or may be present. A rigid housing is coupled to the seal and has a fitting accessible from the exterior communicating with the interior of the housing and a central aperture of the seal for delivering a fluid such as a dye into the interior of the housing or coupling a flow meter thereto to detect the flow of water into or out of the housing. The dye solution is used for leak detection purposes.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DESCRIPTION OF THE PREFERRED EMBODIMENT

Figure 1:
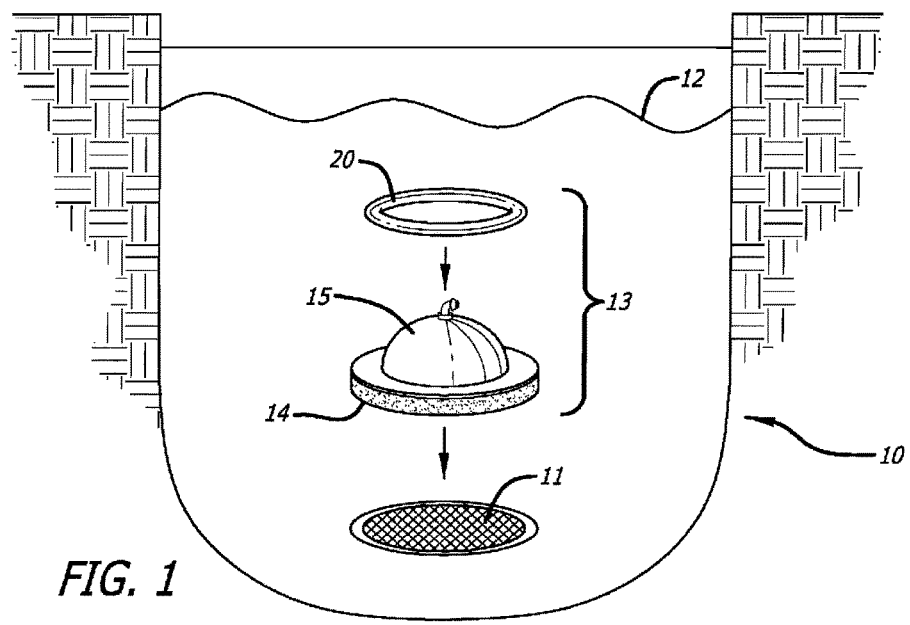
FIG. 1 is a elevational side view of a conventional swimming pool showing the leak detection device prior to installation against the main drain of the pool.

Referring now to the drawings, FIG. 1 is an elevation a I side view of a conventional swimming pool 10 showing the main drain 11 at the bottom of the pool below water level 12. A leak detection device 13 is shown in exploded view.

Figure 2:
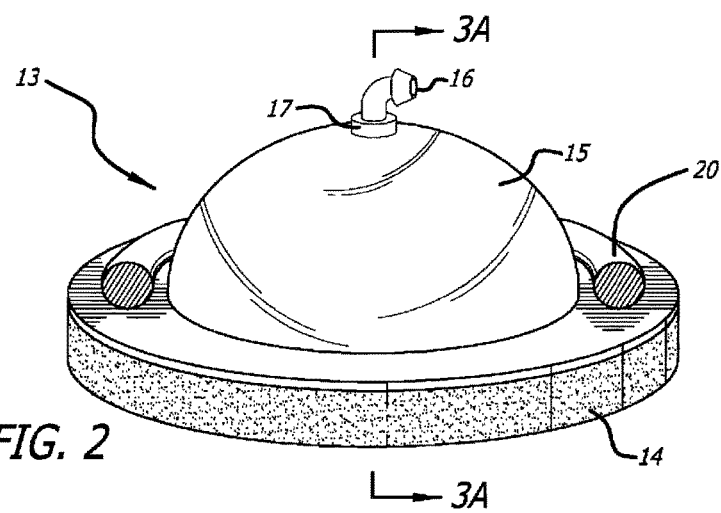
FIG. 2 is an elevational view of a portion of the leak detection device prior to installation.
Figure 3:
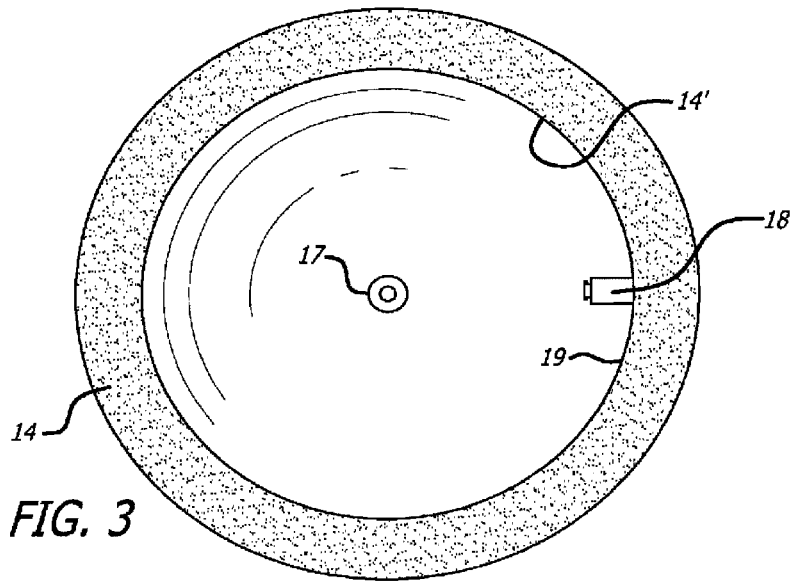
FIG. 3 is a bottom view of a component of the leak detection device of FIG. 2 taken along lines 3-3 of FIG. 2.
Figure 3A:
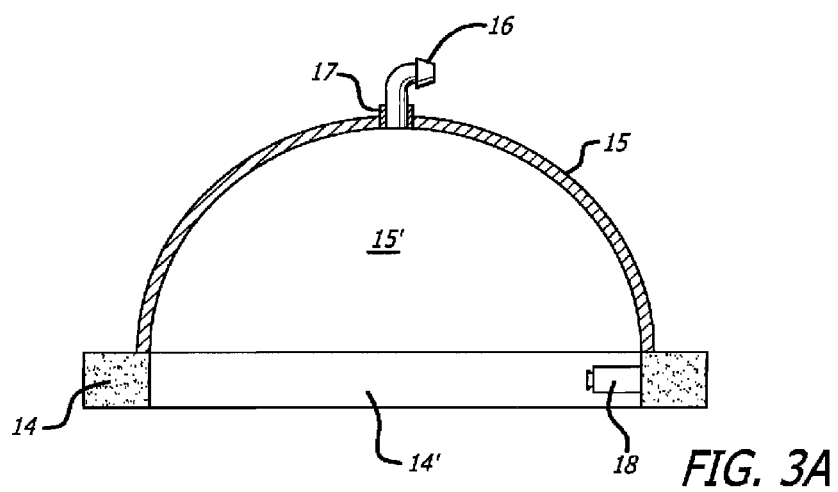
FIG. 3A is a cross-sectional view taken along line 3A-3A of FIG. 2.

As seen in FIG. 2, the leak detection device 13 includes a resilient member 14 which is preferably of rubber, such as a soft synthetic rubber, or any other suitable material. It may be solid or inflatable, and preferably annular, such as circular, circular in outer configuration and of a diameter greater than the diameter of drain 11, which drains are generally circular. Thus, as seen in FIG. 3, member 14 has a central hole or opening 14' communicating with the hollow interior 15' of member 15 (see FIG. 3A). The resilient member 14 can be circular, square or rectangular. Most current drains are rectangular and most commercial drains are square.

Housing 15 thus is secured to member 14 and may be of a solid material, such as plastic, preferably transparent and dome-shaped. However, the housing may be opaque with provisions to determine the flow of dye. For instance a fluid inlet barb 16 may be provided at top of housing 15 communicating with the interior 15' of housing 15 for injecting fluid into the interior 15' of housing 15. The fluid inlet barb 16 may be transparent if the housing is opaque wherein fluid flow can be visually observed. A washer 17, such as a neophrene washer, may be provided where barb 16 enters housing 15 to provide a liquid-tight seal.

As seen in FIG. 3, if member 14 is an inflatable tube, a conventional air inlet 18 may be provided on the bottom wall 19 for inflating tube 14 with air from a suitable exterior source.

Figure 4:
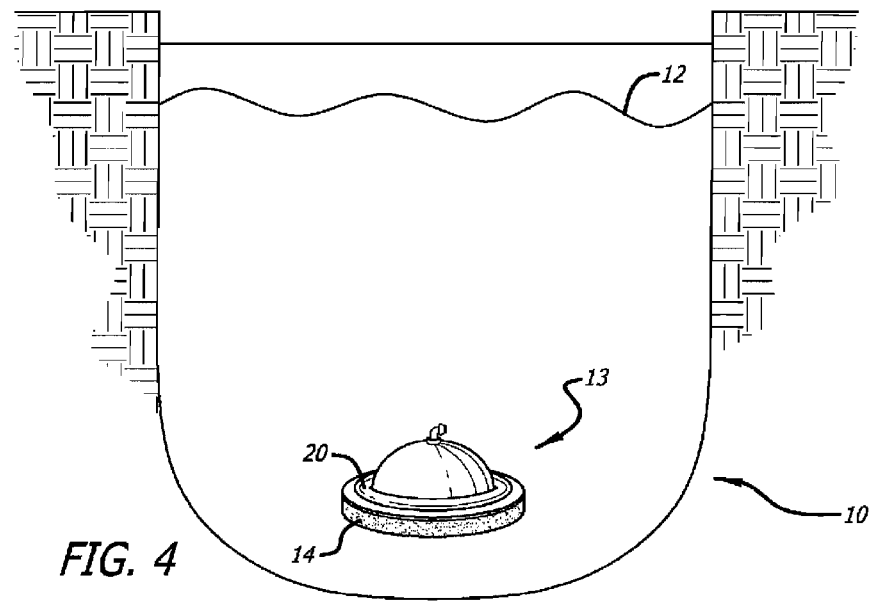
FIG. 4 is a view similar to FIG. 1 showing the leak detection device in position against the pool drainage.

As seen in FIG. 1, a weighted member 20 may be provided to hold housing 15 and member 14 downwardly in a sealing position against drain 11 as seen in FIG. 4. Member 20 is generally a circular ring adapted to encircle housing 15, as seen in FIG. 4, and may be of sufficient weight, such as 10 pounds, to hold device 13 in position against drain 11 creating a seal. Any suitable materials may be used, such as a plastic coated material.

In operation, when the leak detection device 13 is installed against the drain 11 of the pool of FIG. 1, a conventional flow meter may be connected to barb 16 to detect any leaks therethrough. Alternatively, by connecting a suitable hose to barb 16 and running it to the surface of the pool or the like, components in the pool or the like may be tested for leaks while the operator is above water. Thus, any suitable dye solution such as ordinary food coloring and water may be injected therein. If there is a leak, the dye solution will be sucked into the barb 16 that is functioning as an inlet for housing 23. If the pool component is not leaking, the dye will not be sucked in but instead maintain a natural swaying motion underwater.

Alternatively, the pool owner or operator of pool maintenance may dive underwater with a dye solution and inject it through barb inlet 16 using a syringe or the like.

Figure 5:
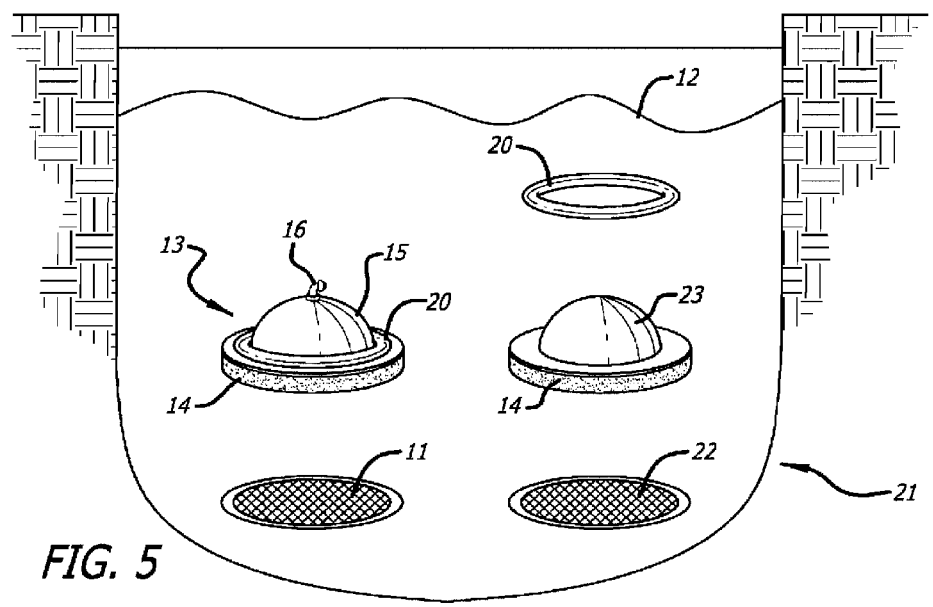
FIG. 5 is an elevational side view of a conventional pool having 2 drains therein with the leak detection device installed over one drain and a second similar device installed over the second drain.
Figure 6:
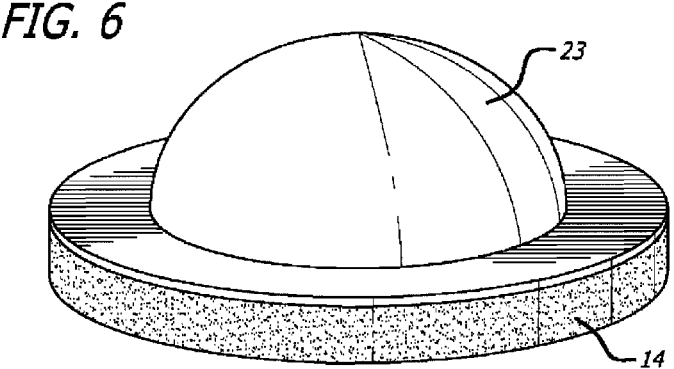
FIG. 6 is an elevational view of a modified portion of the leak detection device of FIG. 2.

As seen in FIG. 5, wherein like numerals refer to like parts of FIG. 1, pool 21 has 2 drains, 11 and 22. Here, housing 23, otherwise similar to housing 15, does not have a barb inlet 16 as seen in FIG. 6. Housing 15 and member 14, weighted by ring member 20, is held against drain 22 while drain is tested for leaks as heretofore discussed, since such drains are generally connected as part of the drain system.

Figure 7:
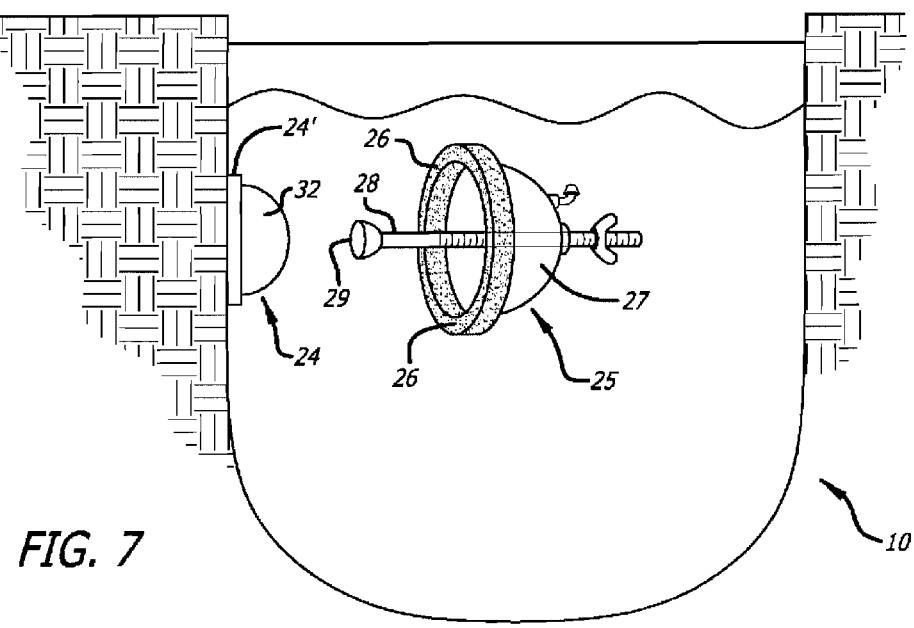
FIG. 7 is a side elevational view of the pool of FIG. 1 showing a conventional pool light installed in the sidewall of the pool and a modified fluid detection device prior to installation.

As seen in FIG. 7, wherein like numerals refer to like parts of FIG. 1, a conventional pool light 24 is shown mounted in the sidewall of pool 10. Here, weighted member 20 is not necessary.

The fluid detection device 25 of FIG. 7 is shown having a resilient member 26, which may be similar to member 14, and may also be inflatable, a housing 27 which may be similar to housing 15, and a barb inlet 16 and washer 17 similar to that shown in the embodiment of FIGS. 1 and 2. However, in this embodiment, a threaded shaft 28 extends through housing 27 and the center of ring 26 and terminates in a conventional suction cup 29 of a resilient material, such as rubber. A resilient washer 30 is provided where shaft 28 enters housing 27, and a wing nut 31, which may be of plastic, may be provided threaded on shaft 28.

Figure 9:
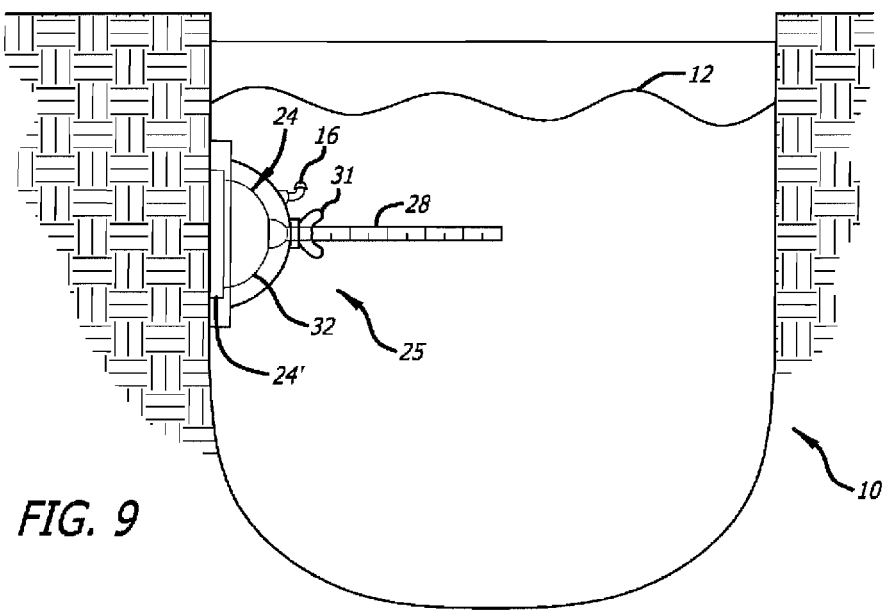
FIG. 9 is a view similar to FIG. 8 showing the fluid detection device sealed to the pool light.

As seen in FIG. 7, shaft 28 extends into a position where cup 29 may engage the outside of dome 32 of light 24. Member 26 is again preferably circular and of a diameter to cover light 24 abutting against the frame 24' holding dome 32 in position (see FIG. 9). Suction cup 29 abuts against dome 32 and wing nut 31 is tightened to force a seal of detection device to light 24 that is created when tightened. The seals actually seal against the surface of the pool. Barb inlet 16 may be used to inject a dye all as previously discussed. While the member is preferably circular, the member can also be square or rectangular. Most current drains are rectangular and most commercial drains are square.

Figure 8:
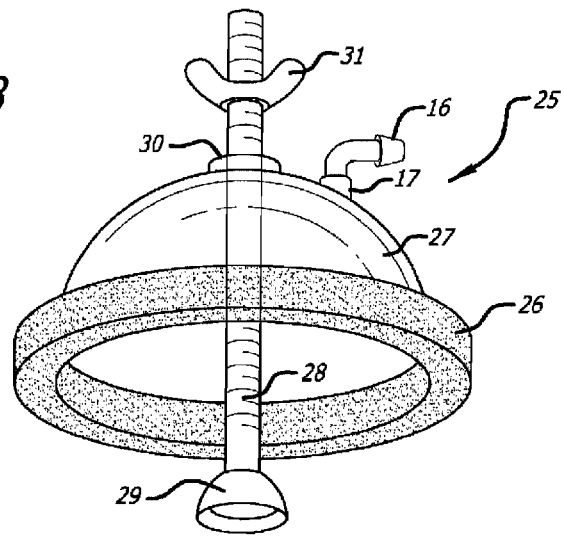
FIG. 8 is an elevational view of the fluid detection device of FIG. 7.
Figure 10:
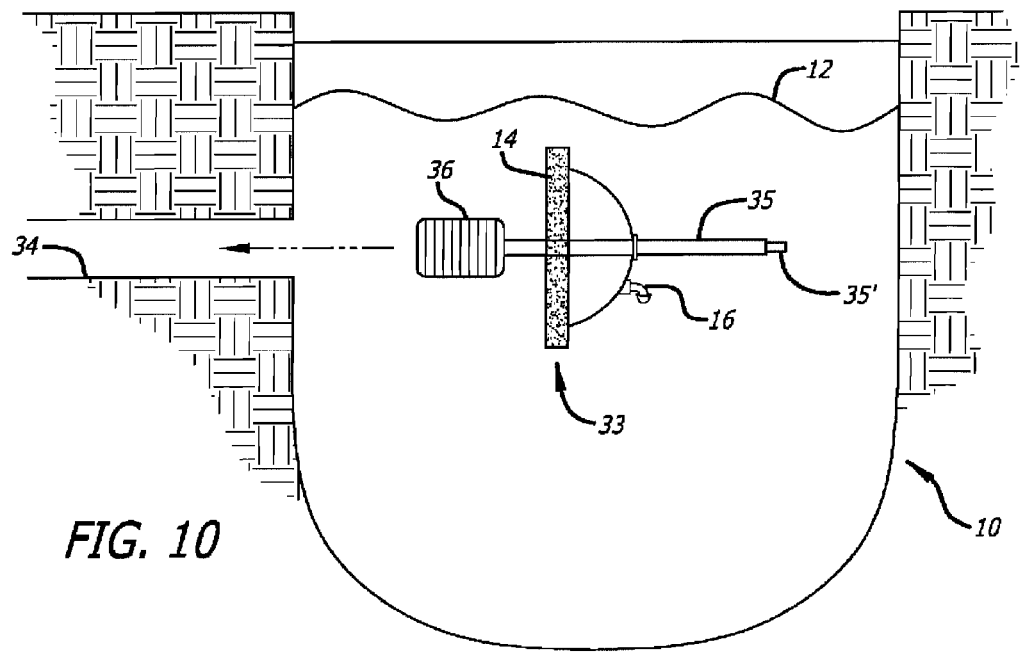
FIG. 10 is a view similar to FIG. 1 showing still another fluid detection device prior to mounting to a suction or discharge pipe of the pool.
Figure 11:
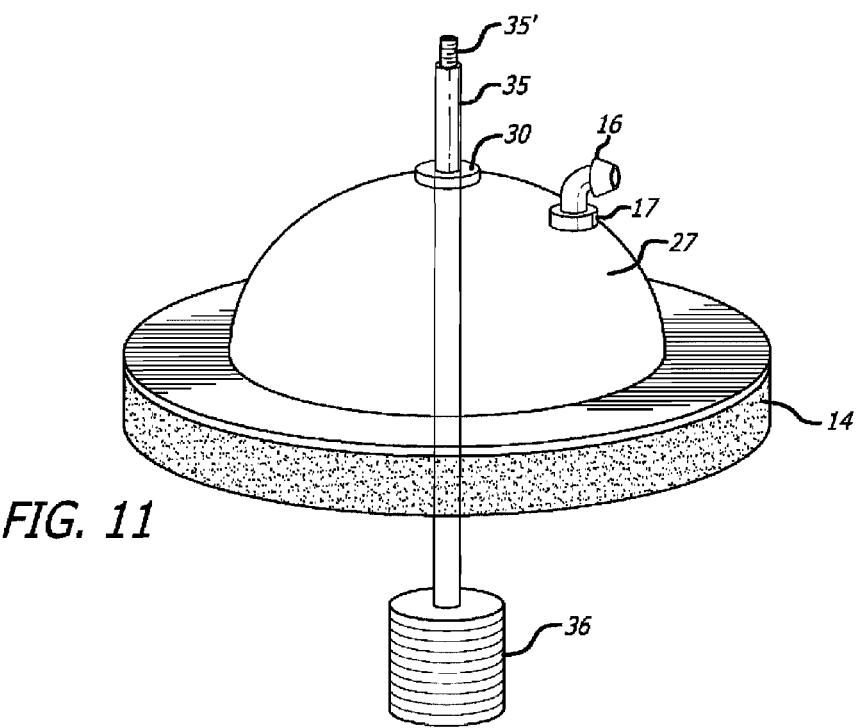
FIG. 11 is an elevational view of the fluid detection device of FIG. 10.
Figure 12:
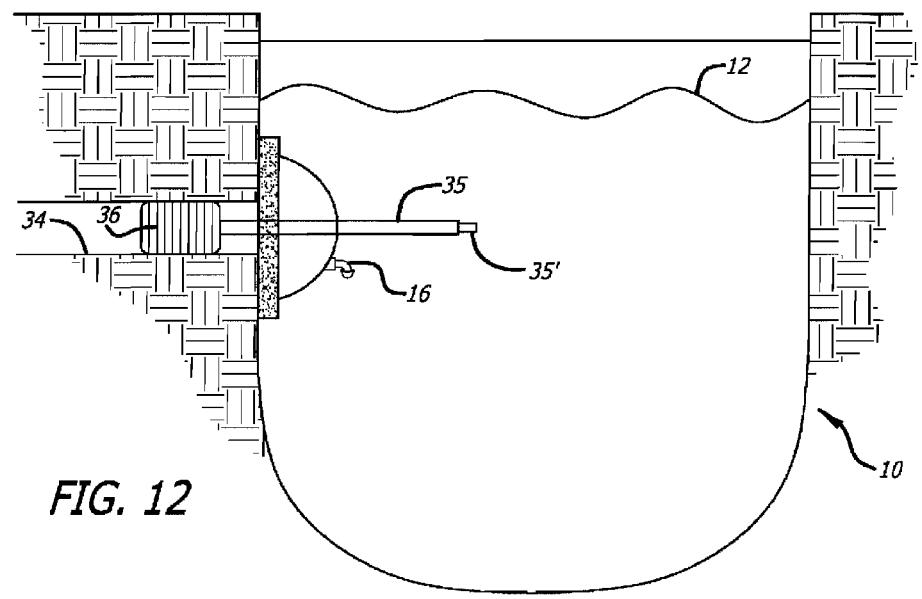
FIG. 12 is a view similar to FIG. 10 illustrating operations of the fluid detection device of FIG. 11.

FIG. 10 shows still another embodiment of the invention. Here, fluid detection device 33, otherwise similar to the fluid detection device components 14, 15 of FIG. 1, shows a conventional suction/discharge pipe 34 of pool 10. As seen in FIG. 11, again member 14 is a resilient member that may be a solid ring or an inflatable ring, and housing 27 is similar to housing 27 of FIG. 8 also having a barbed inlet 16 and washers 17, 30. However, in this embodiment, a hose 35 extends through housing 27, through the center of member 14, and terminates at bottom in an inflatable plug 36. As seen in FIG. 12, plug 36 is inserted into pipe 34 and air may be injected into tube 35 by connecting a suitable source of air to threaded fitting 35' at the top of inflating plug 36 which expands, outwardly against the interior wall of pipe 34, as seen in FIG. 12, to seal off the pipe 34. Again, the leak detection operations discussed above can be carried out through inlet 16.

Figure 13:
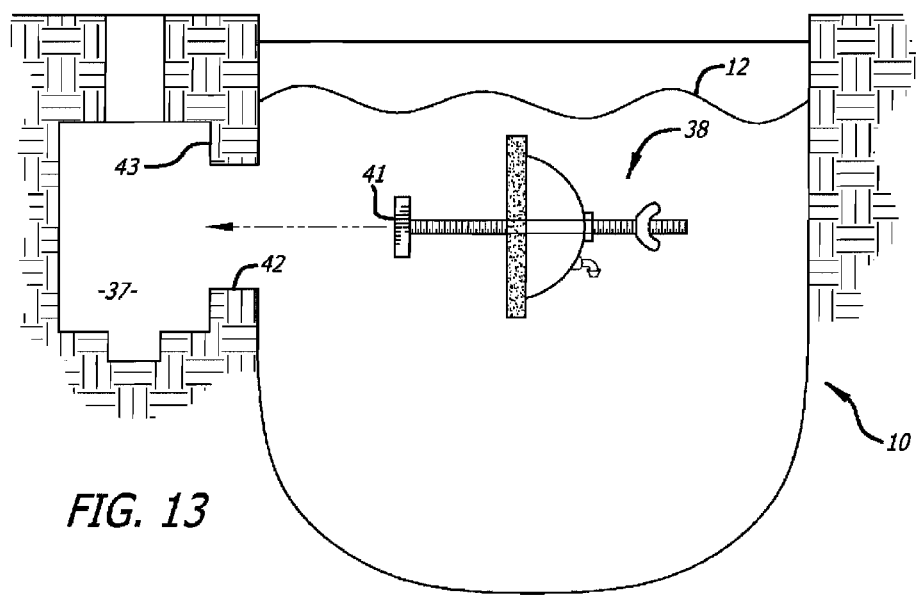
FIG. 13 is a side elevational view of the pool of FIG. 1 showing a conventional skimmer mounted in the side wall and a fluid detection device similar to those discussed in FIGS. 1 to 12.
Figure 14:
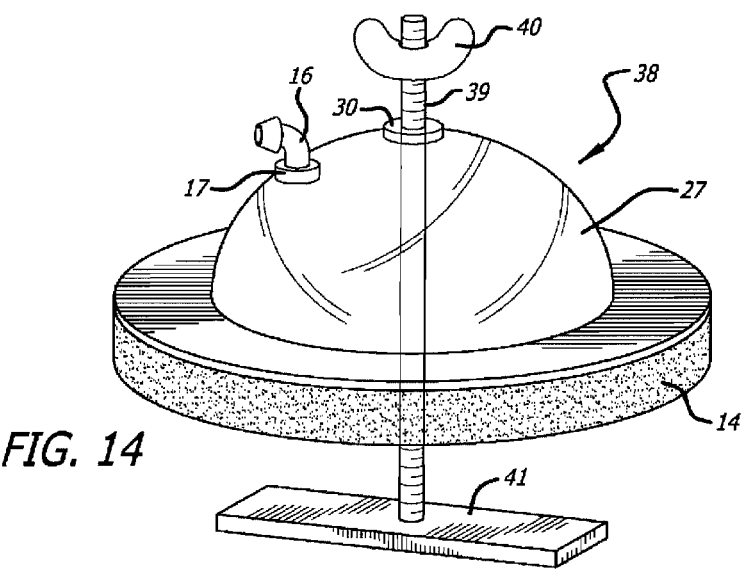
FIG. 14 is an elevational view of the fluid detection device alone of FIG. 13.

FIG. 13 shows a skimmer 37 mounted in the side wall of pool 10 and a fluid detection device 38 shown in detail in FIG. 14. Here, member 14 and housing 27 may be identical to the member 14 and housing 27 of FIG. 8. However, threaded shaft 39, having wing nut 40 threaded thereon, terminates in a brace 41, which may be elongated and generally rectangular, and of any suitable material, such as plastic.

Figure 15:
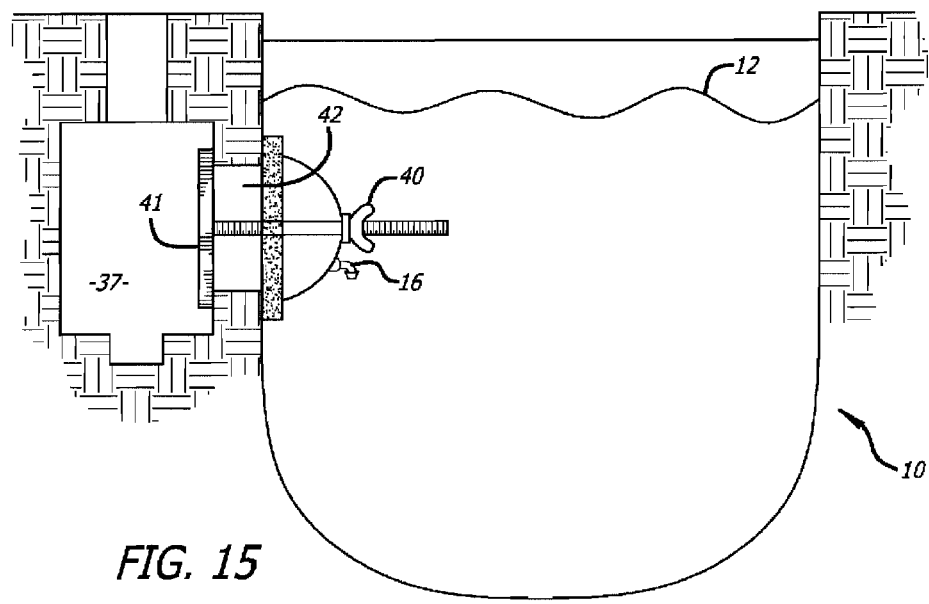
FIG. 15 is a view similar to FIG. 13 showing the fluid detection device in position engaging the pool skimmer.

As seen in FIG. 15, brace 41 is inserted into the opening 42 of skimmer 37, being tilted to facilitate entry, then nut 40 is tightened to seal brace 41 against the inner wall 43 surrounding opening 42 of skimmer 37 sealing off the same as previously, discussed.

Figure 16:
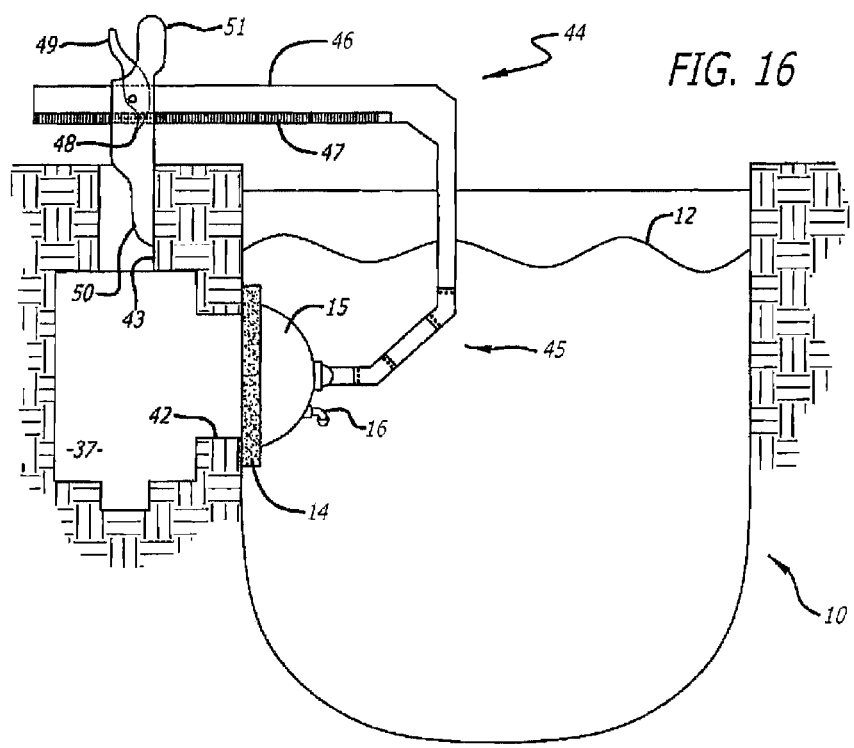
FIG. 16 is a side elevational view of the pool of FIG. 1 similar to FIG. 13 but showing a modified leak detection device in installed position.
Figure 17:
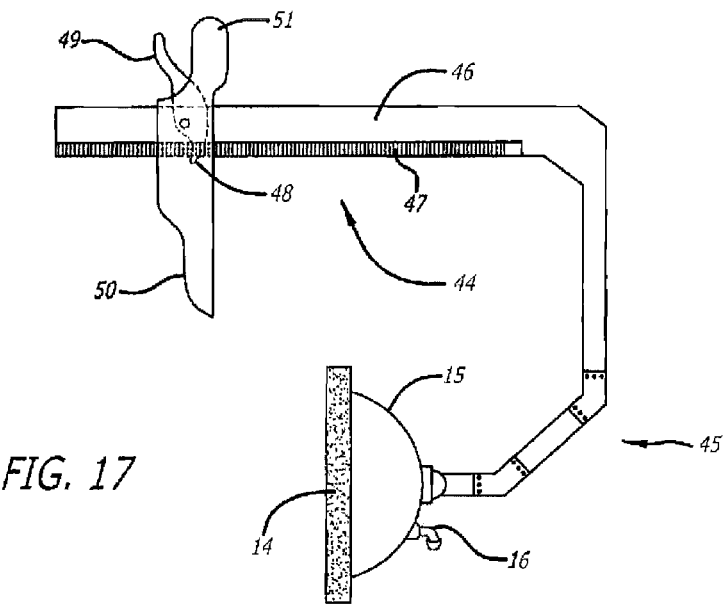
FIG. 17 is an elevational view of the fluid detection device alone of FIG. 16.

Again, inlet 16 may be used to carry out the aftermentioned leak detection. Still another modification is shown in FIG. 16. The fluid detection device 44 includes a housing 15 and resilient member 14 and inlet 16 similar to that of the embodiment of FIG. 1. However, in this embodiment, an adjustable clamp 45 is coupled to housing 15 and has an elongated portion 46 with a plurality of spaced slots or notches engaged by a tooth 48 of a trigger 49 mounted in a clamp portion 50 extending downwardly from extension portion 46. By grasping handle 51 and squeezing trigger 49, into and out of engagement with notches 47, clamp portion 50 can be ratcheted closed along elongated portion 46 similar to a conventional jar lid opener. Thus, as seen in FIG. 17, clamp portion 50 is extending down into the interior of skimmer 37, the skimmer lid having been removed, abutting against inner wall 43, and sealing resilient member 14 and housing 15 against the opening 42 leading into skimmer 37 when trigger 49 is squeezed and clamp portion 50 latches closed.

It can be seen that there are described various embodiments of the invention. Variations thereof may occur to an artisan and the scope of the invention should only be limited by the scope of the appended claims. Any suitable materials or dimensions may be used to carry out the teachings of the invention. Member 14 need only be of a sufficient size to completely surround and seal against the pool component being tested for leaks.

Figure 18:
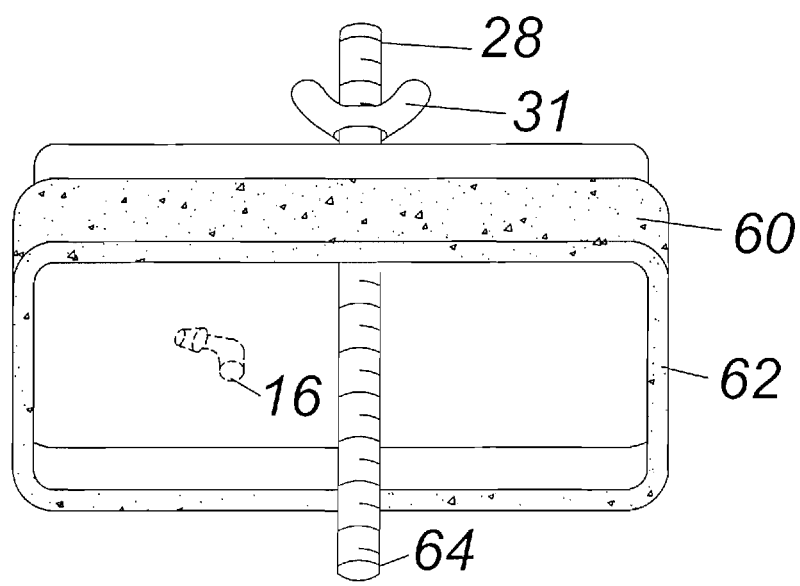
FIG. 18 is an elevational view of a rectangular shaped fluid detection device.
Figure 19:
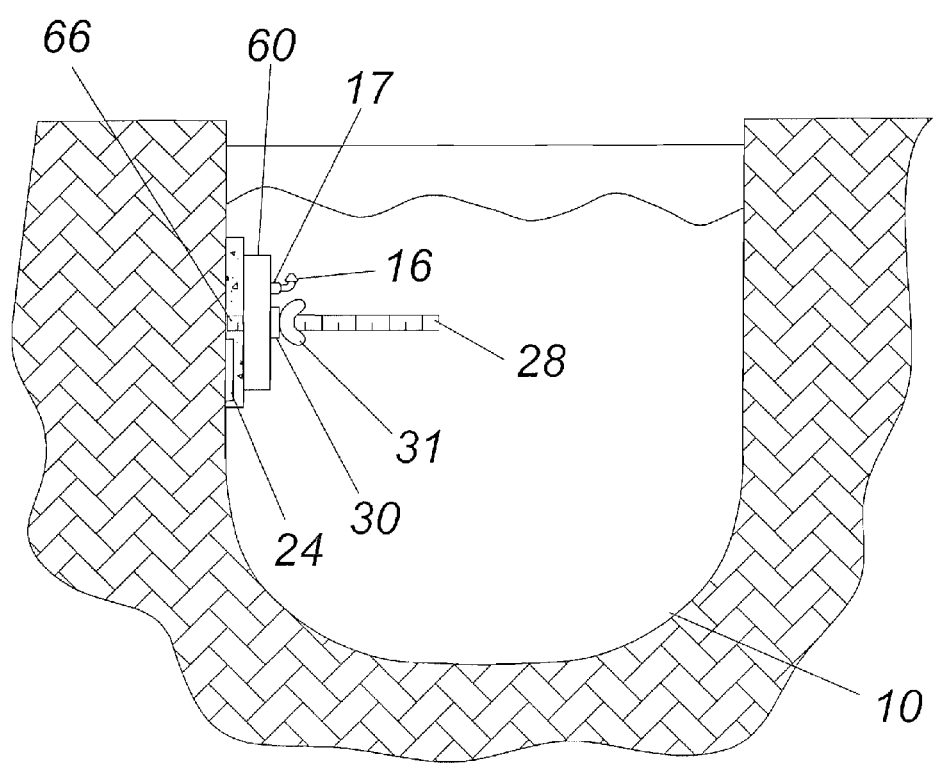
FIG. 19 is a side elevational view of the pool showing a conventional pool light installed in the sidewall of the pool and a modified fluid detection device of FIG. 17 threaded into a swimming pool light threaded socket.

As depicted in FIG. 19, wherein like numerals refer to like parts of FIG. 1, a conventional pool light 24 is shown mounted in the sidewall of pool 10. The fluid detection device 60 of FIGS. 18 and 19 is shown having a resilient member 62 secured to a substantially square or rectangle shaped housing 60 which operates similar to housing 15 and includes a barb inlet and washer 17 similar to that shown in the embodiment of FIGS. 1 and 2. However, in this embodiment, a threaded shaft extends through housing 60 and terminates with threads 64 that are constructed and arranged to match a threaded receptacle 66 of the swimming pool light 24. For instance, most all pool lights are secured to a base by use of a threaded screw. The threaded screw can be removed and the threaded shaft 28 used to directly engage the pool light support. A resilient washer 30 is provided where shaft 28 enters the housing 60, and a wing nut 31, which may be of plastic, may be provided threaded on shaft 28.

In this embodiment, the housing 60 is rectangular and the housing offset so that the shaft 28 enters the housing 60 closer to one edge. The amount of pressure applied during the leak detection is negligible wherein the seal 62 is capable of securing the housing 60 to form a sealed interior space. As with the previous embodiments, the housing is preferably transparent but may also be made opaque. In yet another embodiment, the housing may have a transparent sections or a sight glass to assist in visual detection of flow or dye movement.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A leak detecting device for a swimming pool light in a water filled swimming pool comprising:
   a housing having a continuous perimeter edge sized to extend around a swimming pool light forming a hollow interior having a threaded rod extending through an aperture in said housing;
   an anchoring attachment secured to an end of the threaded rod for immovably anchoring the housing to an underwater swimming pool light;
   an annular resilient seal secured to said perimeter edge, said seal adapted to contact and form a seal between said housing and an underwater surface adjacent the swimming pool light, said seal being for effecting anchoring in a sealing engagement around the swimming pool light and being in a non-movable stationary position relative to the swimming pool light;
   an inlet forming an opening through said housing and extending into the opening providing accessible from an exterior to selectively deliver a dye solution for leak detection purposes into the interior of said housing;
   whereby the flow of the dye inserted in the interior is observable by a user of the device for determining leakage underwater within the defined perimeter relative to the defined underwater surface of the swimming pool.

2. The leak detecting device for swimming pool lights according to claim 1 wherein said resilient seal is a generally circular ring.

3. The leak detecting device for swimming pool lights according to claim 1 including wherein said housing is dome-shaped.

4. The leak detecting device for swimming pool lights according to claim 1 including wherein said housing is square-shaped.

5. The leak detecting device for swimming pool lights according to claim 1 wherein said housing is of a transparent plastic material.

6. The leak detecting device for swimming pool lights according to claim 1 wherein said inlet to said housing is of a transparent plastic material to allow the viewing of the flow of the dye inserted in the interior.

7. The leak detecting device for swimming pool lights according to claim 1 wherein said housing is of an opaque material.

8. The leak detecting device for swimming pool lights according to claim 1 wherein said attachment is a suction cup formed from a resilient material.

9. The leak detecting device for swimming pool lights according to claim 1 wherein said attachment is a threaded tip constructed and arranged to thread into a reciprocal thread formed in the swimming pool light.

10. The leak detecting device for swimming pool lights according to claim 1 including a flow meter coupled to said inlet to indicate the flow of water into or out of said housing.

11. The leak detecting device for swimming pool lights according to claim 10 wherein said flow meter is transparent to allow the viewing of the flow of the dye inserted past the flow meter.

12. The leak detecting device for swimming pool lights according to claim 1 wherein said housing has an inner wall and a nut is threaded on said rod outwardly of said housing adapted to pull said suction cup toward said inner wall and tighten the same against said housing whereby said resilient member encircling said light seals off the same.

13. The leak detecting device for swimming pool lights according to claim 1 wherein the housing and seal are a device such that when operable, the device is connected above the surface of the water in the swimming pool with only a flexible pipe for delivering dye.

* * * * *

UNITED STATES PATENT AND TRADEMARK OFFICE
CERTIFICATE OF CORRECTION

PATENT NO. : 10,088,383 B2
APPLICATION NO. : 15/279590
DATED : October 2, 2018
INVENTOR(S) : Mark D. Marino It is certified that error appears in the above-identified patent and that said Letters Patent is hereby corrected as shown below:

In the Claims

Change the word "accessible" to "access" in Column 6, Line 36 of Claim 1.

Signed and Sealed this
Twenty-second Day of January, 2019

Andrei Iancu
*Director of the United States Patent and Trademark Office*